US012687461B2

(12) United States Patent
Hwang et al.

(10) Patent No.: US 12,687,461 B2
(45) Date of Patent: Jul. 21, 2026

(54) METHOD FOR DIAGNOSING BEARING FAULT ON BASIS OF MOTOR THREE-PHASE CURRENT SIGNAL, AND DEVICE FOR PERFORMING METHOD

(71) Applicant: ONEPREDICT CO., LTD., Seoul (KR)

(72) Inventors: Tae Wan Hwang, Seoul (KR); Young Hoon Son, Seoul (KR); Young June Ban, Seoul (KR); Woo Cheol Lim, Seoul (KR)

(73) Assignee: ONEPREDICT CO., LTD., Seoul (KR)

( * ) Notice: Subject to any disclaimer, the term of this patent is extended or adjusted under 35 U.S.C. 154(b) by 395 days.

(21) Appl. No.: 18/562,088

(22) PCT Filed: Apr. 27, 2022

(86) PCT No.: PCT/KR2022/005985
§ 371 (c)(1),
(2) Date: Nov. 17, 2023

(87) PCT Pub. No.: WO2022/245004
PCT Pub. Date: Nov. 24, 2022

(65) Prior Publication Data
US 2024/0241011 A1 Jul. 18, 2024

(30) Foreign Application Priority Data
May 20, 2021 (KR) ........................ 10-2021-0064961

(51) Int. Cl.
*G01M 13/04* (2019.01)

(52) U.S. Cl.
CPC .................................. *G01M 13/04* (2013.01)

(58) Field of Classification Search
CPC ....... G01M 13/04; G01R 11/40; G01R 23/16; G01R 25/04; G01R 31/34; G01R 31/52; G01R 31/343
See application file for complete search history.

(56) References Cited

U.S. PATENT DOCUMENTS 12,535,383 B2 * 1/2026 Saarinen ............... G01M 13/04
2008/0309366 A1 12/2008 Zhou et al.

FOREIGN PATENT DOCUMENTS

CN 113176092 A * 7/2021 ......... G01M 13/045
JP 6108043 B2 4/2017
(Continued)

OTHER PUBLICATIONS

International Search Report from PCT/KR2022/005985, mailed Aug. 30, 2022.

*Primary Examiner* — Daryl C Pope
(74) *Attorney, Agent, or Firm* — Mark T. Vogelbacker; Eckert Seamans Cherin & Mellott, LLC

(57) ABSTRACT

A method for diagnosing a bearing fault on the basis of a current signal, and a device for performing the method, can include the steps, performed by a bearing failure diagnostic device, of: receiving a motor three-phase current signal; denoising the motor three-phase current signal; converting the denoised motor three-phase current signal to a single-phase current signal; determining a characteristic factor on the basis of the single-phase current signal; and determining, on the basis of the characteristic factor, whether a bearing fault exists.

4 Claims, 9 Drawing Sheets

(a) DE BEARING OUTER RING DEFECT INDUCTION MOTOR (b) NDE BEARING OUTER RING DEFECT INDUCTION MOTOR

(56)                References Cited

FOREIGN PATENT DOCUMENTS

| KR | 10-2009-0078075 | A | 7/2009 |
| KR | 10-2011-0108950 | A | 10/2011 |
| KR | 10-2126493 | B1 | 7/2020 |

* cited by examiner (a) DE BEARING OUTER RING DEFECT INDUCTION MOTOR (b) NDE BEARING OUTER RING DEFECT INDUCTION MOTOR

CURRENT SIGNAL RECEIVER
(210)

DENOISER
(220)

FIRST CURRENT SIGNAL CHANGER
(230)

SECOND CURRENT SIGNAL CHANGER
(240)

DOMAIN TRANSFORMER
(250)

FEATURE DETERMINER
(260)

BEARING DEFECT DETERMINER
(270)

PROCESSOR
(280)

(a) RESULTS OF APPLYING WAVELET DENOISING (b) wavelet denoising process (c) WAVELET TYPE

METHOD FOR DIAGNOSING BEARING FAULT ON BASIS OF MOTOR THREE-PHASE CURRENT SIGNAL, AND DEVICE FOR PERFORMING METHOD

CROSS-REFERENCE TO RELATED APPLICATION

This application is a National Phase of International Application Number PCT/KR2022/005985, filed Apr. 27, 2022, which claims priority to and the benefit of Korean Patent Application Number 10-2021-0064961, filed May 20, 2021, the disclosures of which are incorporated herein by reference in their entireties.

TECHNICAL FIELD

The present invention relates to a method for diagnosing a bearing defect in a motor based on a motor three-phase current signal, and an apparatus for performing the same. Specifically, the present invention relates to a method for diagnosing a bearing defect in a motor by transforming a motor three-phase current signal and extracting a feature, and an apparatus for performing the same.

BACKGROUND ART

A rotating machine is one of the most widely used mechanical installations in industry, and starting up a motor is essential for starting up the rotating machine. The motor inevitably suffers damage due to wear, crack faults, and performance degradation in an environment where loads continue to apply during operation. However, when the wear, crack faults, and performance degradation are not properly managed and exceed limit levels, a fatal accident or interruption of use occurs and enormous damage and cost losses occur. To prevent these situations, existing systems rely on thorough preventive maintenance during operation and high-cost/high-stability systems are operated. However, since the maintenance is carried out at regular intervals regardless of actual defects, there is a problem of incurring cost losses due to unnecessary replacement of normal parts and interruption of operation during maintenance time, and there is a limit to preventing sudden system failure.

In recent years, in order to solve these problems, prognostics and health management (PHM) technologies for detecting abnormalities in a mechanical system early and predicting failures in advance are being researched. Prognostics and health management technologies include two main approaches, and first, a model-based approach diagnoses and predicts a failure based on a physical failure model obtained by modeling a process of failure. This approach has high accuracy, enables failure diagnosis even with a small amount of data, and is able to be applied in various operating environments by changing model variables. However, with the advancement of process automation technology, system complexity significantly increases and failure mechanisms become difficult to identify, making it difficult to fully implement the model. In addition, the modeling process requires help of experts in the field, and thus it costs a lot of money to construct and maintain the model. Due to these factors, application areas of current model-based approaches are very limited.

Next, a data driven approach finds important factors related to a failure in data and infers system reliability and health information using statistical methods, machine learning, and deep learning techniques. Among them, machine learning and deep learning techniques may predict a future failure by learning a relationship between health factors and failure on their own through learning. This approach may be applied to multivariate, nonlinear systems where it is difficult to implement a physical damage model, but requires a lot of data to train a prediction model.

Technical Problem

The present invention is directed to solving all of the above-mentioned problems.

In addition, the present invention is directed to providing a method for independently performing diagnosis of a bearing defect through a feature capable of distinguishing a bearing defect (for example, an outer ring defect, an inner ring defect, and the like) from other defects (for example, an imbalance, a rotor rod breakage, and a stator winding short circuit) so that the bearing defect is independently diagnosed.

In addition, the present invention is directed to providing an apparatus for independently performing diagnosis of a bearing defect through a feature capable of distinguishing a bearing defect (for example, an outer ring defect, an inner ring defect, and the like) from other defects (for example, an imbalance, a rotor rod breakage, and a stator winding short circuit) so that the bearing defect is independently diagnosed.

Technical Solution

According to an aspect of the present invention, there is provided a method for diagnosing a defect in a bearing based on a current signal comprises receiving, by a bearing defect diagnosis apparatus, a motor three-phase current signal, performing, by the bearing defect diagnosis apparatus, denoising on the motor three-phase current signal, transforming, by the bearing defect diagnosis apparatus, the denoised motor three-phase current signal into a single-phase current signal, determining, by the bearing defect diagnosis apparatus, a feature based on the single-phase current signal and determining, by the bearing defect diagnosis apparatus, whether the bearing is defective based on the feature.

Meanwhile, wherein the transforming of the denoised motor three-phase current signal into the single-phase current signal includes a first transformation step of transforming, by the bearing defect diagnosis apparatus, the denoised motor three-phase current signal into a two-phase current signal and a second transformation step of transforming, by the bearing defect diagnosis apparatus, the two-phase current signal into the single-phase current signal.

Further, wherein the first transformation step is performed through transformation into a two-dimensional coordinate system having a d-axis coincident with a direction of magnetic flux generated by an a-phase of a spatial coordinate system of the motor three-phase current signal and a q-axis orthogonal thereto, and the second transformation step is performed through vector calculation.

According to another aspect of the present invention, there is provided a bearing defect diagnosis apparatus configured to diagnose a defect in bearing based on a current signal comprises a current data receiver implemented to receive a motor three-phase current signal and a processor operably connected to the current data receiver, wherein the processor is implemented to perform denoising on the motor three-phase current signal, transform the denoised motor three-phase current signal into a single-phase current.

Meanwhile, wherein the processor performs a first transformation for transforming the denoised motor three-phase current signal into a two-phase current signal and a second transformation for transforming the two-phase current signal into the single-phase current signal.

Further, wherein the first transformation is performed through transformation into a two-dimensional coordinate system having a d-axis coincident with a direction of magnetic flux generated by an a-phase of a spatial coordinate system of the motor three-phase current signal and a q-axis orthogonal thereto, and the second transformation is performed through vector calculation.

Advantageous Effects

The present invention is directed to providing a method for independently performing diagnosis of a bearing defect through a feature capable of distinguishing a bearing defect (for example, an outer ring defect, an inner ring defect, and the like) from other defects (for example, an imbalance, a rotor rod breakage, and a stator winding short circuit) so that the bearing defect is independently diagnosed.

The present invention is directed to providing an apparatus for independently performing diagnosis of a bearing defect through a feature capable of distinguishing a bearing defect (for example, an outer ring defect, an inner ring defect, and the like) from other defects (for example, an imbalance, a rotor rod breakage, and a stator winding short circuit) so that the bearing defect is independently diagnosed.

MODES OF THE INVENTION

Figure 1:
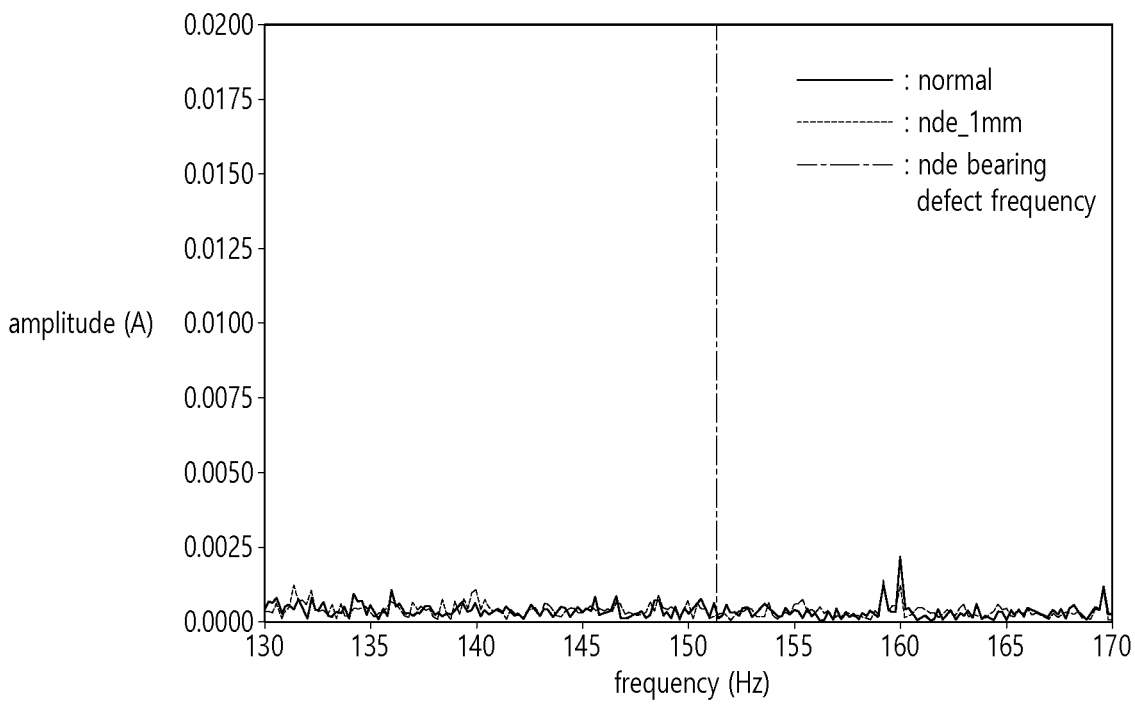
FIG. 1 is a graph showing results of applying the conventional technology to current signals of a normal motor and a bearing defect motor.
Figure 1:
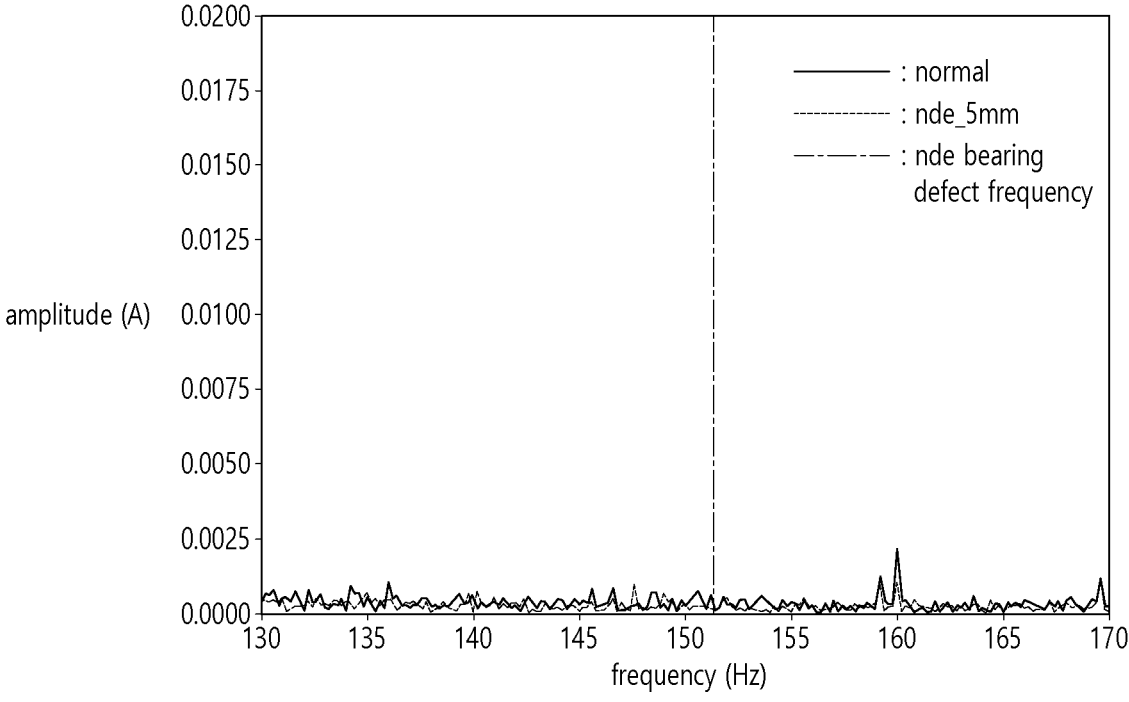

The detailed description of the present invention will be made with reference to the accompanying drawings showing examples of specific embodiments of the present invention. These embodiments will be described in detail such that the present invention can be performed by those skilled in the art. It should be understood that various embodiments of the present invention are different but are not necessarily mutually exclusive. For example, a specific shape, structure, and characteristic of an embodiment described herein may be implemented in another embodiment without departing from the scope and spirit of the present invention. In addition, it should be understood that a position or arrangement of each component in each disclosed embodiment may be changed without departing from the scope and spirit of the present invention. Accordingly, there is no intent to limit the present invention to the detailed description to be described below. The scope of the present invention is defined by the appended claims and encompasses all equivalents that fall within the scope of the appended claims. Like reference numerals refer to the same or like elements throughout the description of the figures.

Hereinafter, in order to enable those skilled in the art to practice the present invention, exemplary embodiments of the present invention will be described in detail with reference to the accompanying drawings.

The existing method for diagnosing a bearing defect in an induction motor based on stator current data utilizes modulation characteristics of a rotational frequency of the motor and a bearing defect frequency that occur when the bearing defect occurs. Conventionally, by using a size of an amplitude of each defective component as a feature through motor current spectrum analysis (MCSA), when an amplitude value is relatively high compared to a normal state, it is determined that the bearing is defective.

In the conventional technology, the motor current spectrum analysis that utilizes the modulation characteristics of the rotational frequency of the motor and the bearing defect frequency that occur in a single-phase current signal when the bearing defect occurs is used. In this method, a component at which modulation occurs is calculated when a defect occurs in the induction motor, and by using the amplitude of each defect component as a feature, when a value of the feature is relatively high compared to the normal state, it is determined that the bearing is defective.

However, depending on the complexity of the system that exists in an actual field and various unquantifiable uncertainties, there are cases where it is not possible to confirm the bearing defect frequency using the conventional technology. In addition, since the amplitude value of the single-phase spectrum generally increases due to a stator defect and other electrical defects, it is difficult to independently diagnose a bearing defect using a relative amplitude value of the bearing defect frequency.

FIG. 1 is a graph showing results of applying the conventional technology to current signals of a normal motor and a bearing defect motor.

Referring to FIG. 1, it can be seen that there is no difference in amplitude in defect frequency components of normal and bearing defect data. In FIG. 1, a solid line refers to normal, a dashed line refers to a drive end (de) bearing defect, and a one-dot chain line refers to a bearing defect frequency. In this case, it can be seen that a defect is not able to be distinguished through the fact that no difference between current amplitudes of normal and bearing defect induction motors is observed at a bearing defect frequency (about 150 Hz).

That is, when the conventional technology is used, it is difficult to make an independent determination as to whether a bearing is defective.

In the present invention, a method for overcoming the inaccuracy of existing bearing defect determination as described above and diagnosing a bearing defect based on a current signal is disclosed.

Figure 2:
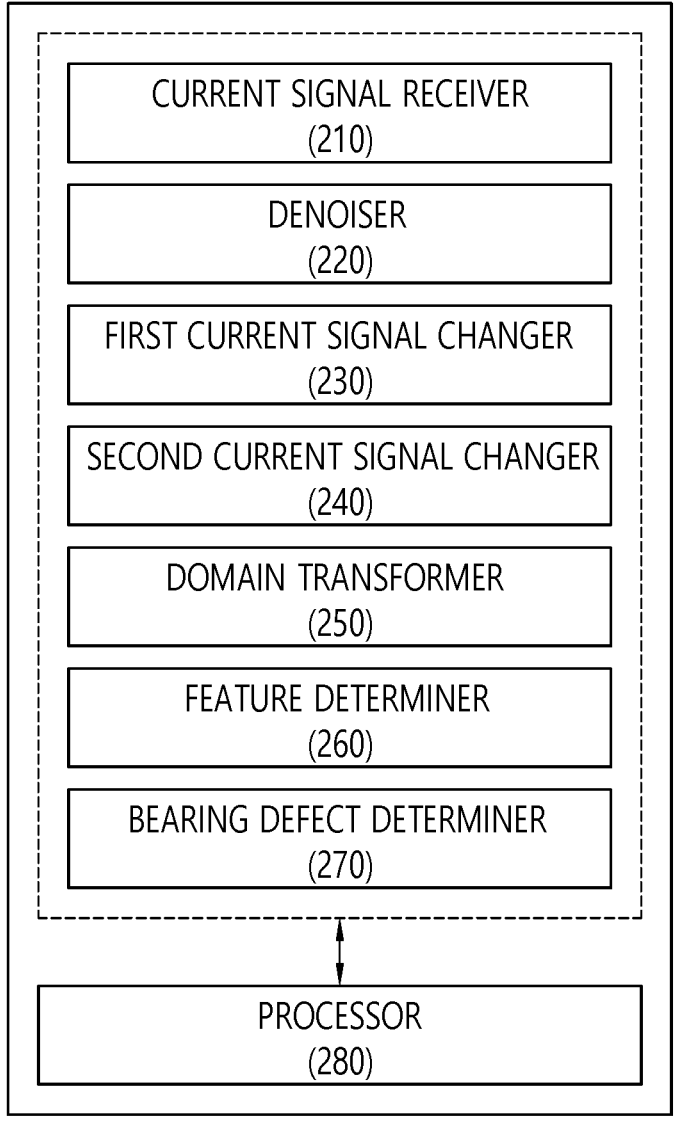
FIG. 2 is a conceptual diagram illustrating a bearing defect diagnosis apparatus that performs bearing defect diagnosis according to an embodiment of the present invention.

FIG. 2 is a conceptual diagram illustrating a bearing defect diagnosis apparatus that performs bearing defect diagnosis according to an embodiment of the present invention.

In FIG. 2, a bearing defect diagnosis apparatus that performs diagnosis on a bearing defect in a motor is disclosed.

Referring to FIG. 2, the bearing defect diagnosis apparatus may include a current signal receiver 210, a denoiser 220, a first current signal changer 230, a second current signal changer 240, a domain transformer 250, a feature determiner 260, a bearing defect determiner 270, and a processor 280.

The current signal receiver 210 may be implemented to receive a motor three-phase current signal for a motor current.

The denoiser 220 may be implemented to remove noise mixed in the motor three-phase current signal. For example, the denoiser 220 may be implemented to perform denoising using wavelets. A denoising procedure for the motor three-phase current signal will be described below.

The first current signal changer 230 may be implemented to change the denoised motor three-phase current signal into a two-phase current signal. A spatial coordinate system of the motor three-phase current may be transformed into a two-dimensional coordinate system, and through the coordinate system transformation, the denoised motor three-phase current signal may be changed into the two-phase current signal.

The second current signal changer 240 may be implemented to change the two-phase current signal into a single-phase current signal. The two-phase current signal may be changed into the single-phase current signal based on vector transformation.

The domain transformer 250 may be implemented to change a domain of the single-phase current signal from the time domain to the frequency domain.

The feature determiner 260 may be implemented to determine a feature based on the single-phase current signal whose domain has been changed into the frequency domain.

The bearing defect determiner 270 may determine whether a bearing defect has occurred based on the feature.

The processor 280 may be implemented to control operations of the current signal receiver 210, the denoiser 220, the first current signal changer 230, the second current signal changer 240, the domain transformer 250, the feature determiner 260, and the bearing defect determiner 270.

Figure 3:
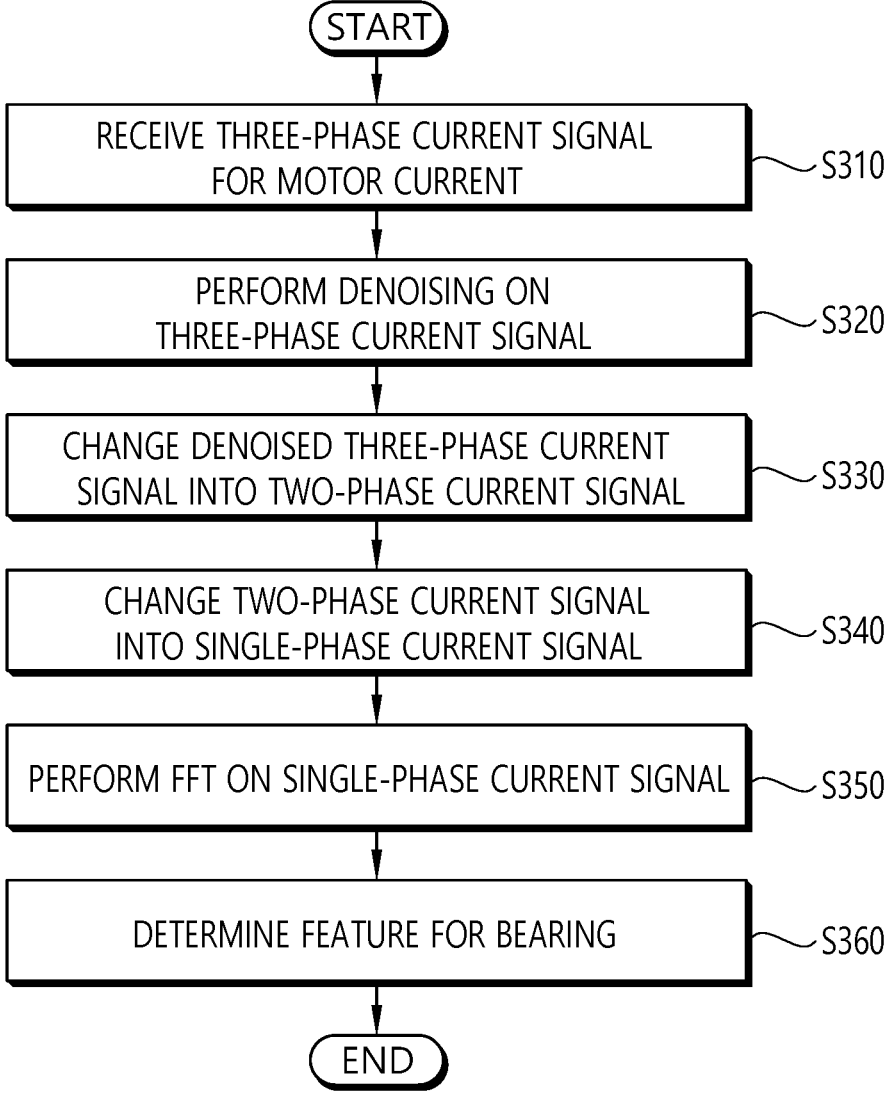
FIG. 3 is a flowchart showing a method for diagnosing a bearing defect based on a current signal according to an embodiment of the present invention.

FIG. 3 is a flowchart showing a method for diagnosing a bearing defect based on a current signal according to an embodiment of the present invention.

Referring to FIG. 3, the bearing defect diagnosis apparatus receives a motor three-phase current signal for a motor current (step S310).

In order to determine whether there is an abnormality in a bearing, the motor three-phase current signal connected to the bearing may be received.

The bearing defect diagnosis apparatus performs denoising on the motor three-phase current signal (step S320).

In the present invention, the denoising may be implemented to remove noise mixed in the motor three-phase current signal. For example, the denoising may be performed based on wavelets. The denoising procedure for the motor three-phase current signal will be described below.

The bearing defect diagnosis apparatus changes the denoised motor three-phase current signal into a two-phase current signal (step S330).

A spatial coordinate system of the motor three-phase current may be changed into a two-dimensional coordinate system, and through the coordinate system transformation, the denoised motor three-phase current signal may be changed into the two-phase current signal.

The bearing defect diagnosis apparatus changes the two-phase current signal into a single-phase current signal (step S340).

The two-phase current signal may be changed into the single-phase current signal based on vector transformation. The vector transformation method will be described below.

The bearing defect diagnosis apparatus performs fast Fourier transform (FFT) on the single-phase current signal (step S350).

The current signal in the time domain may be transformed to the frequency domain through Fourier transform (FT). Fast Fourier transform (FFT) is one of the efficient algorithms for quickly performing FT, and an FFT process of the present invention may be used to decompose the single-phase current signal, which is a time series signal, into components in the frequency domain.

The bearing defect diagnosis apparatus may determine a feature for the bearing (step S360).

The feature of the present invention is an amplitude value of an actual rotational frequency of the motor extracted after reducing the motor three-phase current signal to the single-phase current signal in dimension.

The motor generates an electromagnetic pulse when a rotor rotates and passes a pole of a stator. When a shaft imbalance defect occurs, strength of an electromagnetic signal increases because a rotation radius of the motor increases. When an electrical defect such as a rotor rod defect and stator winding short circuit occurs, the overall amplitude value increases. Therefore, for defects other than the bearing defect, a phenomenon that the amplitude of a current increases as a defect occurs is exhibited. However, when the bearing defect occurs, since the bearing defect prevents the motor from smoothly rotating, strength of the electromagnetic signal generated by the rotation of the motor decreases, and thereby, a phenomenon that the amplitude value of the current at the actual rotation speed of the motor becomes lower than a value in a normal state occurs.

Based on the characteristics of the bearing defect, the feature for the bearing may be determined.

Figure 4:
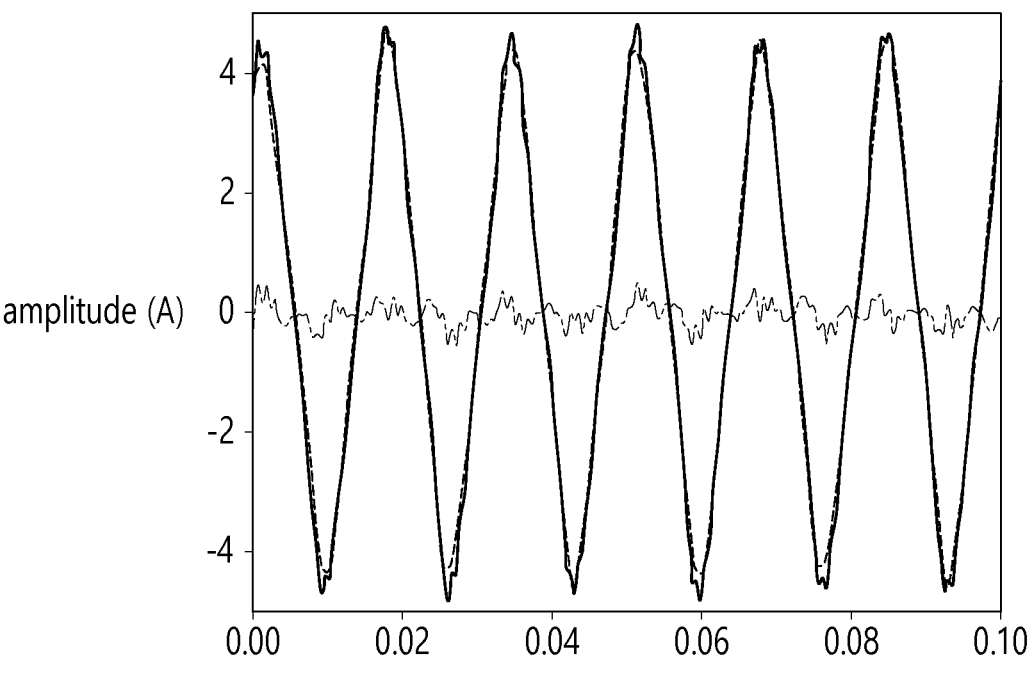
FIGS. 4 to 6 are conceptual diagrams illustrating a denoising method according to an embodiment of the present invention.
Figure 5:
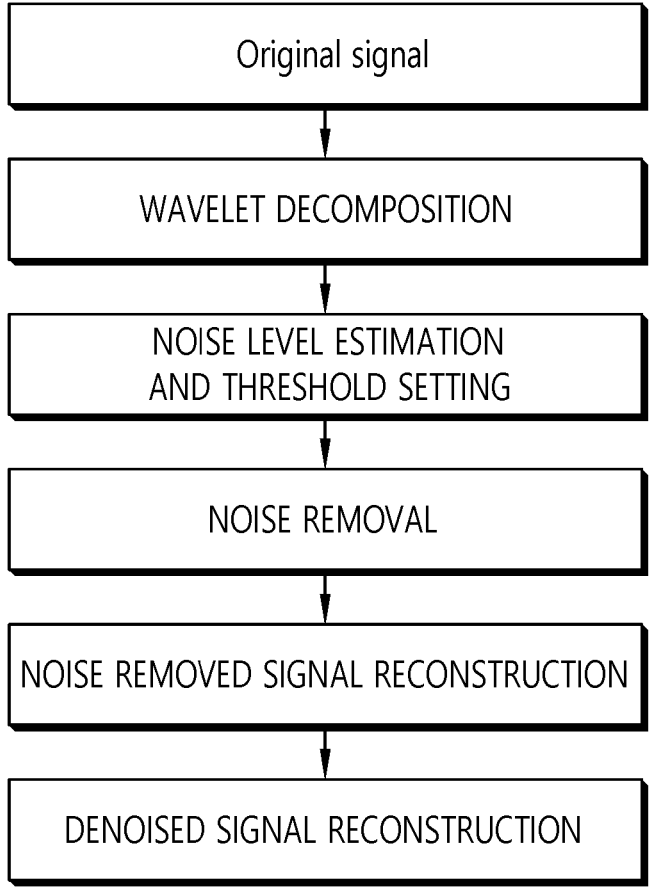
Figure 6:
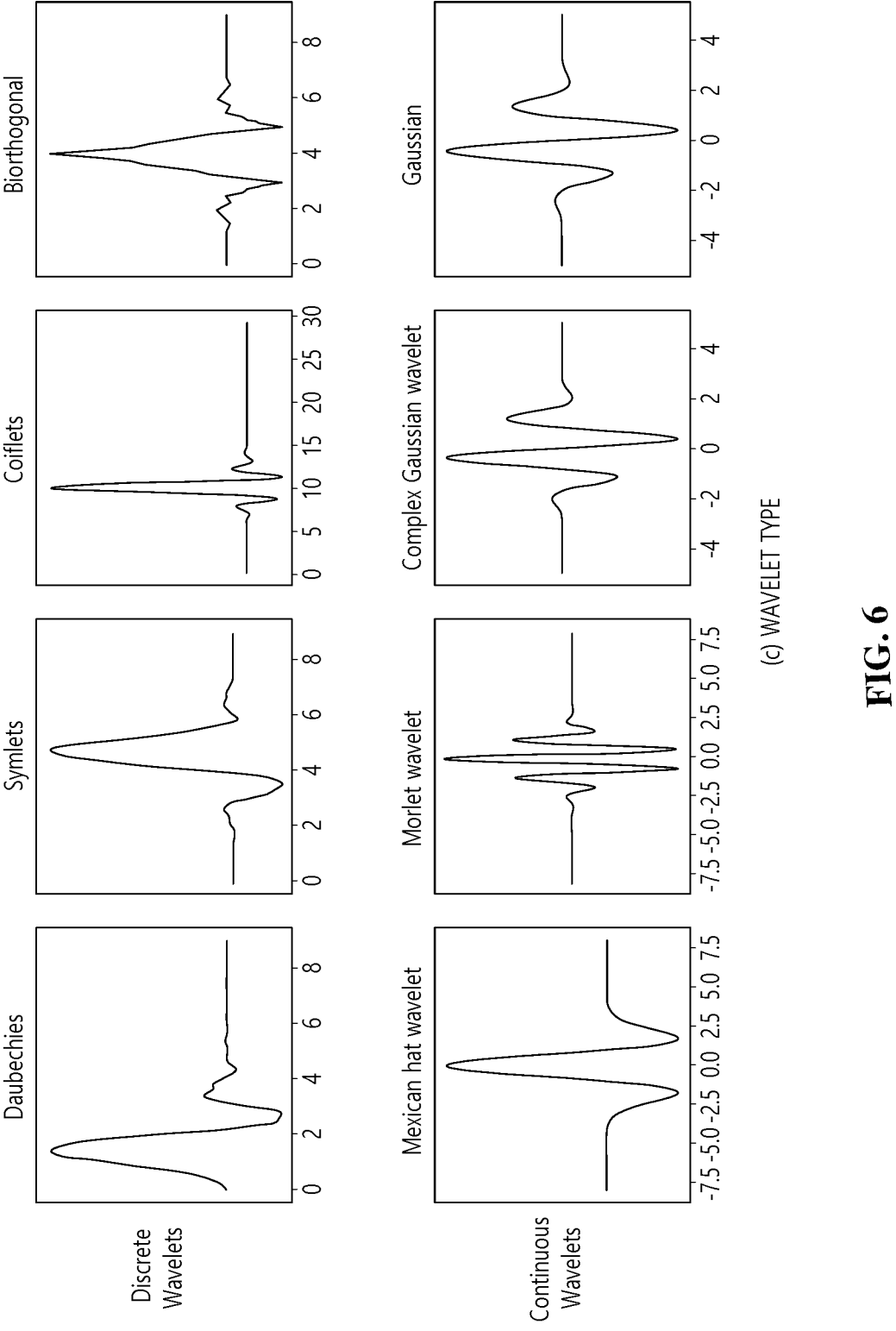

FIGS. 4 to 6 are conceptual diagrams illustrating a denoising method according to an embodiment of the present invention.

In FIGS. 4 to 6, a method for performing denoising on a motor three-phase current signal is disclosed.

Referring to FIG. 4, results of applying wavelet denoising to the motor three-phase current signal are disclosed.

First, current signals may be decomposed by scaling (expanding or contracting in time) and shifting (moving in a time axis) various functions referred to as wavelets such as those disclosed in FIG. 6. The current signals are decomposed through wavelets, and among the decomposed current signals, signals with energy below a certain level specified by a user are determined to be noise signals, and the noise signals may be removed. The signals from which the noise signals have been removed are reconstructed and a denoised current signal that maintains signal characteristics is generated.

Specifically, as disclosed in FIG. 5, wavelet decomposition may be performed on the motor three-phase current signal, a noise level may be estimated, and a threshold for noise removal may be set. Noise may be removed based on the threshold, and a denoised current signal that maintains the signal characteristics may be generated by reconstructing the signal from which the noise has been removed.

Figure 7:
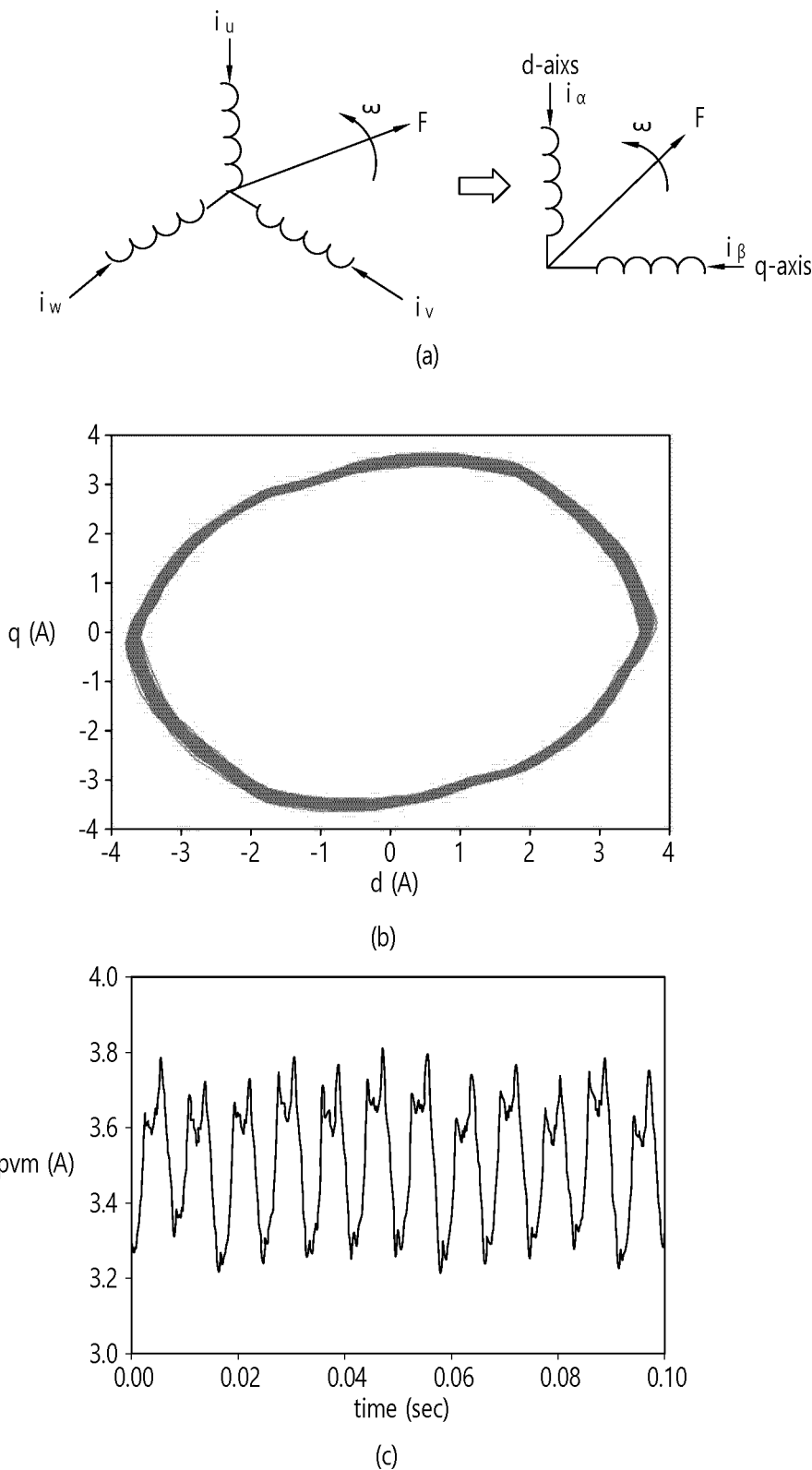
FIG. 7 is a conceptual diagram illustrating a method for transforming a motor three-phase current signal according to an embodiment of the present invention.

FIG. 7 is a conceptual diagram illustrating a method for transforming a motor three-phase current signal according to an embodiment of the present invention.

In FIG. 7, the method for changing, by the bearing defect diagnosis apparatus, a denoised motor three-phase current signal into a two-phase current signal is disclosed.

Referring to FIG. 7, a spatial coordinate system of the motor three-phase current signal may be transformed from a uvw coordinate system to an α-β reference frame or d-q stationary reference frame. Transformation into a two-dimensional coordinate system having a d-axis coincident with a direction of magnetic flux generated by an a-phase of a spatial coordinate system of the motor three-phase current signal and a q-axis orthogonal thereto may be performed.

The two-dimensional coordinate system in which the motor three-phase current signal is expressed is the α-β reference frame (or d-q stationary reference frame).

Equation 1 below is an equation for changing a three-dimensional spatial coordinate system into a two-dimensional coordinate system.

$$\begin{bmatrix} i_\alpha \\ i_\beta \end{bmatrix} = \begin{bmatrix} 1 & -\dfrac{1}{2} & -\dfrac{1}{2} \\ 0 & \dfrac{\sqrt{3}}{2} & -\dfrac{\sqrt{3}}{2} \end{bmatrix} \begin{bmatrix} i_u \\ i_v \\ i_w \end{bmatrix} \qquad < \text{Equation 1} >$$

The three-dimensional spatial coordinate system containing information on the denoised motor three-phase current signal may be transformed into the α-β reference frame based on Equation 1, and the α-β reference frame may be expressed in another term, the d-q stationary reference frame.

That is, in the present invention, three-phase current signals of u, v, and w may be transformed into two-phase current signals of d and q through coordinate system transformation. FIG. 7B shows a current orbit obtained when the two-phase current signals are set to a d-axis and a q-axis, respectively.

The denoised motor three-phase current signal may be changed into a two-phase current signal for the d-q stationary reference frame and then changed into a single-phase current signal.

Equation 2 and Equation 3 below are equations for changing a two-phase current signal into a single-phase current signal.

$$VM_h = \sqrt{i_{ds}^2 + i_{qs}^2} = I_m \qquad < \text{Equation 2} >$$

$VM_h$ is a vector calculation value in a normal state, $i_{ds}$ is a d-phase current signal, and $i_{qs}$ is a q-phase current signal.

$$VM_f = \sqrt{i_{dsf}^2 + i_{qsf}^2} = I_m[1 + M\cos(4\pi sf_s t + \varphi)] \qquad < \text{Equation 3} >$$

$VM_f$ is a vector calculation value in a defect state, fs is a power frequency, t is time, and φ is a phase difference.

When the motor is in an ideal state and VM is calculated through the d-phase current and q-phase current, a value of $I_m$ is calculated as shown in Equation 2. Conversely, when a defect occurs in the motor, a value of VM may be determined by modulation characteristics (phase-based transformed equation) of the signal other than the value of $I_m$, as shown in Equation 3. That is, when a defect occurs in the motor depending on a state of the motor, the modulation characteristics of the current signal are included in the value of VM.

The two-phase current signal may be changed into the single-phase current signal through vector calculation based on Equation 2 and Equation 3 above. Unlike Equation 2, which shows the results obtained when the motor is in the normal state, when a defect exists in the motor, the modulation characteristics of the current signal due to the defect may be included in the value of VM, as shown in Equation 3.

In FIG. 7C, a VM waveform changed from the two-phase current signal into the single-phase current signal is disclosed.

Figure 8:
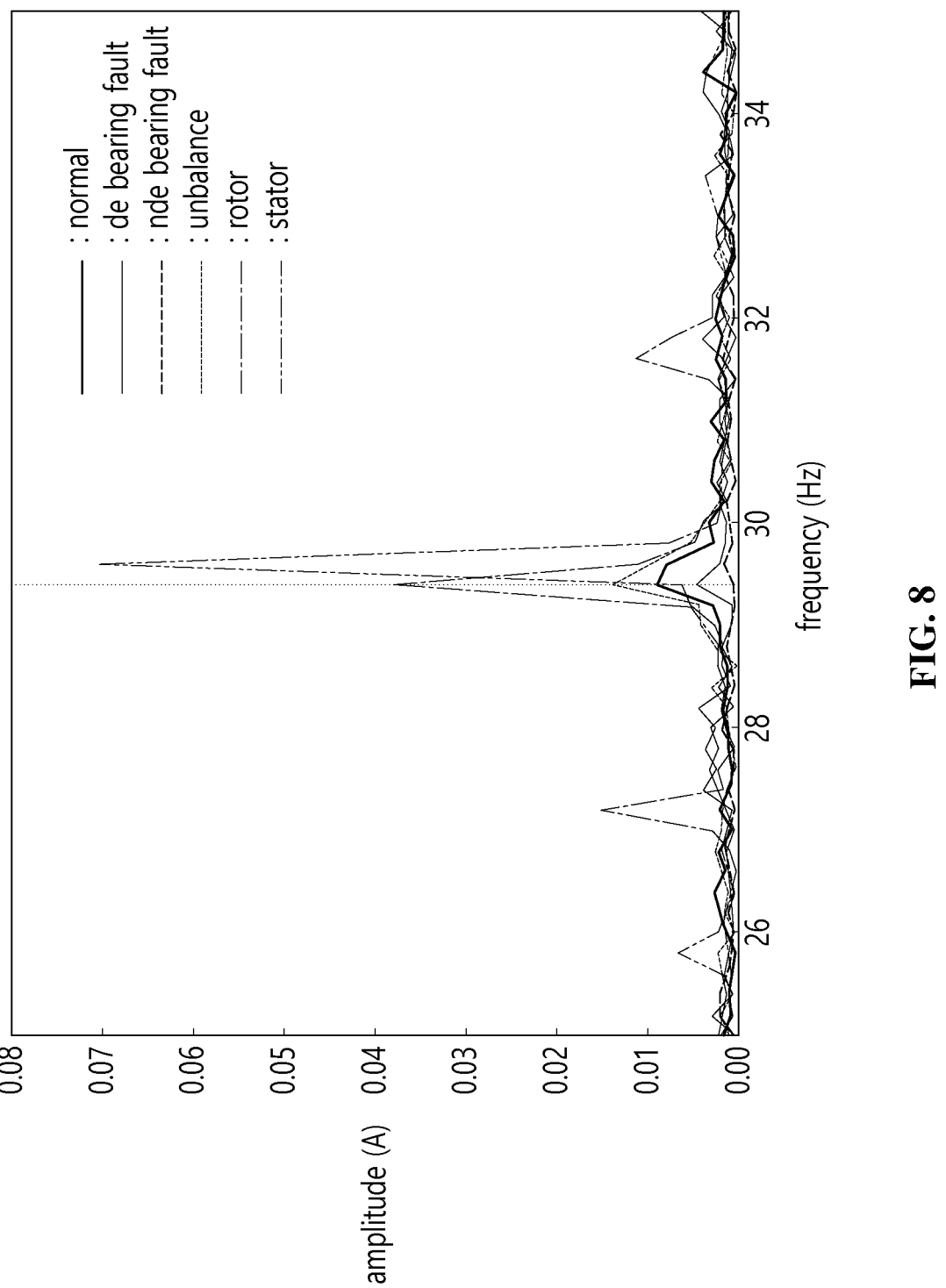
FIG. 8 is a conceptual diagram illustrating a feature according to an embodiment of the present invention.

FIG. 8 is a conceptual diagram illustrating a feature according to an embodiment of the present invention.

In FIG. 8, a method for calculating a feature and a vector calculation spectrum for each motor state are disclosed.

Referring to FIG. 8, the feature is an amplitude value of an actual rotational frequency of the motor extracted after reducing a motor three-phase current signal to a single-phase current signal in dimension.

An electromagnetic pulse is generated when a rotor rotates and passes a pole of a stator in a motor. When a shaft imbalance defect occurs, strength of an electromagnetic signal increases because a rotation radius of the rotor of the motor increases. When an electrical defect such as a rotor rod defect and stator winding short circuit occurs, the overall amplitude value increases.

As illustrated in FIG. 8, defects other than the bearing defect exhibits a phenomenon that the amplitude of a current increases as a defect occurs. However, when the bearing defect occurs, since the bearing defect prevents the motor from smoothly rotating, strength of the electromagnetic signal generated by the rotation of the motor decreases, and thereby, a phenomenon that the amplitude value of the current at the actual rotation speed of the motor becomes lower than a value in a normal state occurs. Here, a vertical dotted line represents the actual rotation speed of the motor.

Equation 4 and Equation 5 below are equations for calculating the feature.

$$f_r = (1 - s)/p * f_i \qquad < \text{Equation 4} >$$

Here, $f_r$ is a rotational frequency of the motor, s is a slip rate, p is the number of pole pairs, and $f_1$ is a supply frequency.

$$ARV = \text{amplitude of } f_{r,vm} \qquad < \text{Equation 5} >$$

Here, ARV (amplitude of rotational frequency in vector modulus) is a feature value, and $f_{r,\ vm}$ is a rotational frequency of the motor in a VM area.

The feature value may be determined through the above equations.

In the graph of FIG. 8, "normal" refers to a state in which there is no defect in the motor. "de" refers to a state in which a defect has occurred in a bearing at the drive end. "nde" refers to a state in which a defect has occurred in a bearing at a non-drive end. "unbalance" refers to a state in which shaft imbalance has occurred. "rotor" refers to a state in which a defect has occurred in the rotor rod. "stator" refers to a state in which a defect has occurred in the stator.

That is, it may be possible to determine whether a defect has occurred in the bearing at the drive end (de) or a defect has occurred in the bearing at the non-drive end (nde) based on the feature as shown in the graph of FIG. 8.

Figure 9:
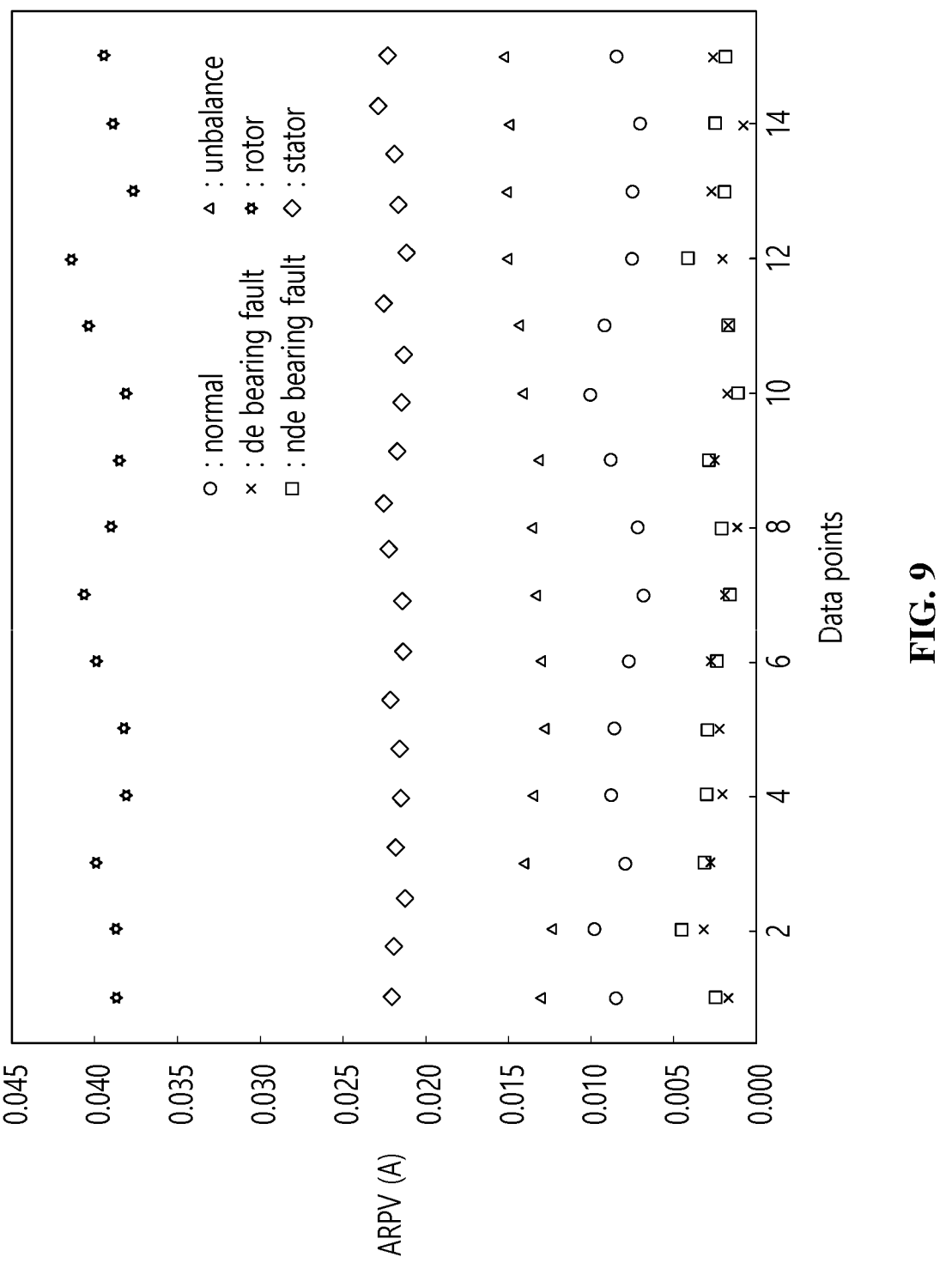
FIG. 9 is a conceptual diagram illustrating results of applying a feature according to an embodiment of the present invention.

FIG. 9 is a conceptual diagram illustrating results of applying a feature according to an embodiment of the present invention.

In FIG. 9, results of independently distinguishing bearing defects occurring in the motor based on the feature are disclosed.

Referring to FIG. 9, the feature may allow motor bearing defects to be independently distinguished from several other failure modes (shaft imbalance, rotor rod defects, and stator winding deterioration) by utilizing only the motor three-phase current signal, which is result of repeated experiments.

Unlike other defects, the bearing defects have ARV values that are low feature values, and may be distinguished from other failure modes.

The embodiments of the present invention described above may be implemented in the form of program instructions that can be executed through various computer units and recorded on computer readable media. The computer readable media may include program instructions, data files, data structures, or combinations thereof. The program instructions recorded on the computer readable media may be specially designed and prepared for the embodiments of the present invention or may be available instructions well known to those skilled in the field of computer software. Examples of the computer readable media include magnetic media such as a hard disk, a floppy disk, and a magnetic tape, optical media such as a compact disc read only memory (CD-ROM) and a digital video disc (DVD), magneto-optical media such as a floptical disk, and a hardware device, such as a ROM, a RAM, or a flash memory, that is specially made to store and execute the program instructions. Examples of the program instruction include machine code generated by a compiler and high-level language code that can be executed in a computer using an interpreter and the like. The hardware device may be configured as at least one software module in order to perform operations of embodiments of the present invention and vice versa.

While the present invention has been described with reference to specific details such as detailed components, specific embodiments and drawings, these are only examples to facilitate overall understanding of the present invention and the present invention is not limited thereto. It will be understood by those skilled in the art that various modifications and alterations may be made.

Therefore, the spirit and scope of the present invention are defined not by the detailed description of the present invention but by the appended claims, and encompass all modifications and equivalents that fall within the scope of the appended claims.

The invention claimed is:

1. A method for diagnosing a defect in a bearing based on a current signal, the method comprising:

receiving, by a bearing defect diagnosis apparatus, a motor three-phase current signal;

performing, by the bearing defect diagnosis apparatus, denoising on the motor three-phase current signal;

transforming, by the bearing defect diagnosis apparatus, the denoised motor three-phase current signal into a single-phase current signal;

determining, by the bearing defect diagnosis apparatus, a feature based on the single-phase current signal; and determining, by the bearing defect diagnosis apparatus, whether the bearing is defective based on the feature, wherein the transforming of the denoised motor three-phase current signal into the single-phase current signal includes:

a first transformation step of transforming, by the bearing defect diagnosis apparatus, the denoised motor three-phase current signal into a two-phase current signal; and a second transformation step of transforming, by the bearing defect diagnosis apparatus, the two-phase current signal into the single-phase current signal.

2. The method of claim 1, wherein the first transformation step is performed through transformation into a two-dimensional coordinate system having a d-axis coincident with a direction of magnetic flux generated by an a-phase of a spatial coordinate system of the motor three-phase current signal and a q-axis orthogonal thereto, and the second transformation step is performed through vector calculation.

3. A bearing defect diagnosis apparatus configured to diagnose a defect in bearing based on a current signal, the bearing defect diagnosis apparatus comprising:

a current data receiver implemented to receive a motor three-phase current signal; and a processor operably connected to the current data receiver, wherein the processor is implemented to perform denoising on the motor three-phase current signal, transform the denoised motor three-phase current signal into a single-phase current signal, determine a feature based on the single-phase current signal, and determine whether the bearing is defective based on the feature, wherein the processor performs a first transformation for transforming the denoised motor three-phase current signal into a two-phase current signal and a second transformation for transforming the two-phase current signal into the single-phase current signal.

4. The bearing defect diagnosis apparatus of claim 3, wherein the first transformation is performed through transformation into a two-dimensional coordinate system having a d-axis coincident with a direction of magnetic flux generated by an a-phase of a spatial coordinate system of the motor three-phase current signal and a q-axis orthogonal thereto, and the second transformation is performed through vector calculation.

* * * * *